April 14, 1970  KAZUHIKO MORIYAMA  3,506,275
SEAL CONSTRUCTION FOR ROTARY COMBUSTION ENGINE
Filed Sept. 25, 1967

INVENTOR
KAZUHIKO MORIYAMA

BY Wenderoth, Lind & Ponack
ATTORNEYS

United States Patent Office 3,506,275
Patented Apr. 14, 1970

3,506,275
SEAL CONSTRUCTION FOR ROTARY
COMBUSTION ENGINE
Kazuhiko Moriyama, Hiroshima-ken, Japan, assignor to
Toyo Kogyo Company Limited, Hiroshima-ken, Japan
Filed Sept. 25, 1967, Ser. No. 670,327
Claims priority, application Japan, Sept. 26, 1966,
41/63,692
Int. Cl. F02b 53/00; F16j 15/34
U.S. Cl. 277—81     4 Claims

ABSTRACT OF THE DISCLOSURE

A seal construction for a rotary piston of an internal combustion engine comprising a sealing ring disposed in an annular groove formed on an end face of the piston, an elastic ring having a substantially U-shaped section and disposed behind said sealing ring in the groove and spring means including a special seat disposed between the legs of said U-shaped elastic ring and urging said sealing ring into sealing engagement with the adjacent end wall of the housing through one of the legs of said elastic ring.

---

This invention relates to improvements in a seal construction for a rotary piston internal combustion engine which maintains sealing contact with excellent sealing action with an adjacent member and has greater durability.

In general, rotary piston internal combustion engines comprise a housing having axially spaced parallel end walls having substantially flat internal surfaces and an annular casing having an epitrochoidal internal peripheral wall with two or more lobes between the end walls and defining a cavity therebetween. A rotary piston is journaled in the cavity on an eccentric portion of a shaft which is coaxial with the cavity and journaled in bearings in the end walls. The piston has substantially flat end faces disposed adjacent to the inner flat face of each end wall and has a peripheral surface with a plurality of circumferentially-spaced apex portions adapted for sealing engagement with the epitrochoidal internal wall of the annular casing to form a plurality of working chambers between the housing and the piston which vary in volume during the planetary motion of the piston as the shaft rotates. The piston end faces are ordinarily provided with annular grooves in which annular seals are inserted for sealing engagement with adjacent inner faces of the end walls for the purpose of preventing leakage or lubricating and/or cooling oil, or working fluid along the piston end faces.

It has been the practice to use, for the purpose of sealing of the above described type of the engine, rings of rubber or the like materials C, as shown in FIGURE 4, for instance, positioned in the axial bottom of the annular groove B on an end face of the piston A, for urging the annular seal ring D towards the adjacent element E for sealing engaging it therewith by the resilient effect of the said rubber rings. In the structure above described and shown in FIGURE 4, however, there is an unavoidable defect of the deterioration of the tight sealing contact due to the loss of the resilient effect of the rubber or the like materials during the long duration of the resilient urging of the seal ring towards the adjacent element.

An object of the present invention is to provide a seal construction in which an annular sealing ring is sealingly urged towards the adjacent element with a well modulated force so as to create an efficient and durable seal by the resilient effect of the device.

A further object of the invention is to provide a seal construction in which an annular sealing ring is urged by spring means disposed between legs of an elastic ring made of rubber-like material, said elastic ring being disposed behind said sealing ring and having a U-shaped cross section through said elastic ring so that the sealing ring is thereby sealingly engaged with the adjacent housing element and at the same time each outer surface of the legs is respectively in tight sealing engagement with the inner end face of the sealing ring and the axial inner bottom of the groove.

Another object of the invention is to provide a seal construction in which the said U-shaped cross section elastic ring engages adjacent elements by at least one annula tip-projection provided on the opposite exterior end faces of the U-shaped legs.

Other and further advantages of the invention will become apparent from the following detailed description and claims taken in conjunction with the accompanying drawings, in which:

Figure 1:
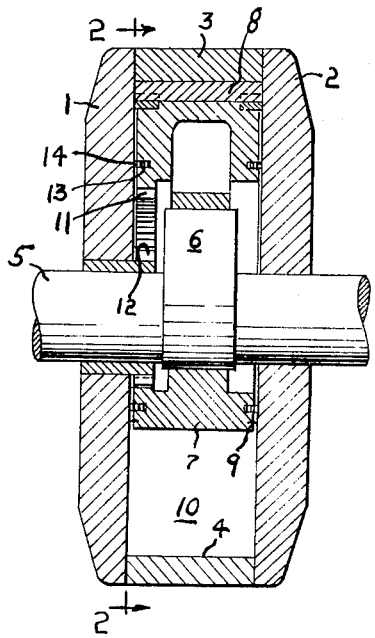
FIGURE 1 is a longitudinal sectional view of a rotary piston internal combustion engine taken along the line 1—1 of FIGURE 2.
Figure 2:
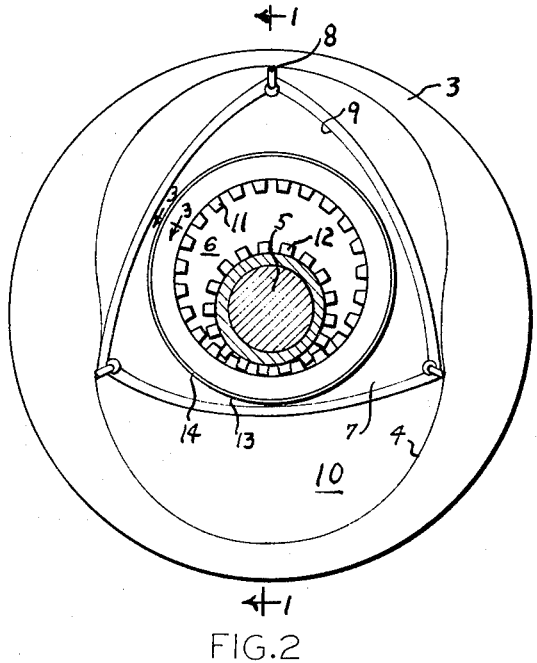
FIGURE 2 is a diagrammatic cross-sectional elevation view of a rotary piston internal combustion engine provided with the annular seal construction of the present invention, which view is taken along the line 2—2 of FIGURE 1.

As shown in FIGURES 1 and 2, the rotary piston internal combustion engine comprises a housing composed of axially spaced end walls 1 and 2, both having substantially flat inner faces, and an annular center wall 3 disposed between and interconnecting said end walls to form a cavity therebetween. The inner surface 4 of the annular center wall 3 preferably has a multi-lobed cross-sectional profile which is basically an epitrochoid. A shaft 5 extends coaxially of the cavity defined by the housing and is journaled in bearings in the end walls 1 and 2. Eccentrically disposed in the housing and journaled on an eccentric portion 6 of the shaft 5 is a rotary piston 7 having a plurality of circumferentially-spaced apex portions around its outer periphery. Each of said apex portions has radially movable apex seal means 8 which is in continuous sealing engagement with the center wall inner surface 4. The opposite ends of the rotary piston are substantially flat faces having side seal strips 9 extending between pairs of apex seals 8, and the side seal strips 9 sealingly engage the end walls 1 and 2 thereby forming, together with the apex seals 8, a plurality of working chambers 10 which vary in volume when the rotary piston 7 rotates within and relative to the housing. During the rotation of the piston 7 and the variation of the volume of the working chamber 10, the intake, compression, power and exhaust strokes are performed. Intake of combustible gas and exhausting of the products of combustion is carried out by means of conventional intake and exhaust ports (not shown). Coaxially secured to the rotary piston in an axial aperture or recess thereof is an internally toothed gear 11, which meshes with an externally toothed gear 12 coaxial with the shaft 5 and secured to one of the end walls for producing the relative motion of the rotary piston and the housing.

Radially inwardly spaced from the side seal strips 9 and opening outwardly on each end face of the piston 7 in the direction of the axis of the shaft 5 is an annular groove 13 in which an annular sealing ring 14 is inserted.

Disposed between the axial inner bottom of the groove 13 and the annular sealing ring 14 is an elastic ring 15 which has a substantially U-shaped cross section having a pair of legs 16. The elastic ring 15 is made of rubber and/or plastic material; and this elastic ring 15 may not be necessarily completely provided with elasticity, but essentially its legs should be comprised so as to be elastic. Disposed between the legs 16 are two annular spring seats 17 and controllably and protectively inserted therebetween is an annular plate spring means 18 which urges the spring seats 17 and the legs 16 of the ring 15 in the axially opposite directions with respect to the axis of the rotary piston 7. The seats 17 each include an axially extended flange portion, which portions face one another to cradle or seat the spring in a radially and axially restrictive manner, with said seats also serving to prevent the metallic like spring plate from imparting wear damage to the legs of the U-shape member during high-speed operation of the engine.

Figure 3:
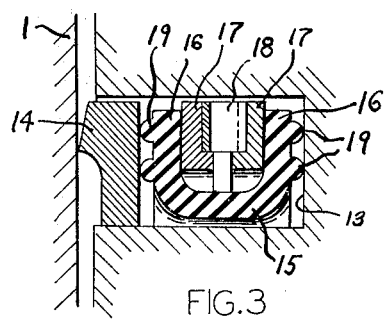
FIGURE 3 is an enlarged sectional view of a part of the engine of FIGURE 2, taken along the line 3—3 of FIGURE 2, and showing a detailed cross-section of the sealing construction according to the invention.
Figure 4:
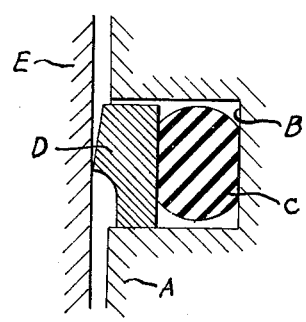
FIGURE 4 is an enlarged sectional view, similar to FIGURE 3, showing a prior art sealing device.

By the resilient effect produced by the corrugated-like plate spring means 18 and, if required, the U-shaped cross-section elastic ring 15, the annular sealing ring 14, which is always urged by the said spring means 18 through the spring seat 17 and one of the legs 16 of the elastic ring 15, maintains resilient sealing engagement with the adjacent end wall 1, as shown in FIGURE 3 and, at the same time each outer surface of the legs 16 is respectively in sealing engagement with the inner end face of the sealing ring 14 and the axial inner bottom of the groove 13, whereby the lubricating and/or cooling oil or the working fluid which is introduced in the clearance of the radially facing surfaces of the sealing ring 14 and the radially facing surfaces of the groove 13 is prevented from leaking therethrough and the sealing between the axial outer end face of the rotary piston 7 and the inner end face of the end walls 1 and 2 is effectively performed.

When annular projections 19 are provided on each outer surface of the legs 16, the engagement of the ring 15 with the adjacent element produces an improved sealing effect, and such projections are preferably a concentric pair of projections as shown in FIGURE 3.

According to the invention, as the annular sealing ring 14 is mainly urged by the plate spring means 18, the annular sealing ring 14 is securely urged into sealing engagement with the adjacent end wall of the housing, even if the deterioration of the elastic ring 15 made of rubber-like material occurs during the long duration of the sealing action. Further, each outer surface of the legs 16 of the elastic ring 15 is respectively in sealing engagement with the inner end face of the sealing ring 14 and the axial bottom of the groove 13 by the resilience of the plate spring means 18, and thereby, the leakage of the lubricating oil or the working fluid is precluded through between the housing end wall and the sealing ring 14 and through between the sealing ring 14 and the groove 13 in which the sealing ring 14 is disposed.

In the accompanying drawing, FIGURE 3 shows the sealing ring 15 having the U-shaped cross-section with the legs 16 extending radially outwardly of the piston, but if required, it is possible to place the ring 15 so that the legs 16 extend radially inwardly, whereby a similar sealing effect as hereinbefore described will be obtained.

What I claim is:

1. A side seal construction for a rotary piston of a rotary combustion engine, which engine has a housing composed of spaced end walls, a generally annular center wall interconnecting outer peripheral portions of said end walls to define a cavity therebetween, a rotary piston rotatably mounted within the said housing, said piston having end faces disposed adjacent to said end walls of the housing and having a plurality of lobed peripheral surfaces cooperating with the peripheral or center wall portion of the housing to define a plurality of working chambers therebetween, the piston end faces each having an annular groove therein, said seal construction comprising:

(a) an annular sealing ring axially slidably positioned in said annular groove;
    (b) an elastic ring made of rubber-like material and having a substantially U-shaped cross-section with the pair of legs of the U extending radially of the piston and disposed behind said annular sealing ring in said annular groove;
    (c) annular spring means disposed between the said legs of the said elastic ring for urging each of the said legs into sealing engagement respectively with adjacent bottom face of the annular groove and with the axial inner end face of the said annular sealing ring, and thereby urging the said annular sealing ring into sealing engagement with the adjacent housing end wall;
    (d) said annular spring means including an annular plate spring and separate restrictive and protective annular spring seats for said spring.

2. A seal construction as defined in claim 1 wherein said spring seats are of generally annular configuration and are disposed at opposite axial sides of said spring and between the respective legs of said elastic ring, and each of said spring seats including an axially extended flanged portion facing each other and upon which said annular spring plate seats in a radial manner to thereby limit or regulate radial elevation of said springs means as well as to protect said elastic ring of U-shape cross-section from potential damage by said corrugated spring plate.

3. A seal construction as claimed in claim 1 in which said legs each have at least one annular projection projecting axially thereof and outwardly of said U-shaped cross-section for sealing engagement with the adjacent bottom face of the said groove and the axial inner face of the said annular sealing ring.

4. A seal construction as claimed in claim 1 in which said legs extend radially outwardly of said piston.

References Cited

UNITED STATES PATENTS

| | | | |
|---|---|---|---|
| 2,547,185 | 4/1951 | Von Bolhar | 277—207 X |
| 3,180,563 | 4/1965 | Jones et al. | 230—145 |
| 3,257,117 | 6/1966 | Ehrhardt | 277—96 |
| 3,300,127 | 1/1967 | Yamamoto et al. | 230—145 |
| 3,309,011 | 3/1967 | Osakada et al. | 230—145 |
| 3,323,712 | 6/1967 | Froede et al. | 230—145 |

FOREIGN PATENTS

| | | |
|---|---|---|
| 1,016,540 | 1/1966 | Great Britain. |

JAMES KEE CHI, Primary Examiner

U.S. Cl. X.R.

123—8; 230—145